United States Patent [19]
Gorshtein et al.

[11] Patent Number: 5,844,830
[45] Date of Patent: Dec. 1, 1998

[54] EXECUTING COMPUTER INSTRUCRIONS BY CIRCUITS HAVING DIFFERENT LATENCIES

[75] Inventors: Valery Y. Gorshtein; Vladimir T. Khlobystov, both of Moscow, Russian Federation

[73] Assignee: Sun Microsystems, Inc., Mountain View, Calif.

[21] Appl. No.: 719,115

[22] Filed: Sep. 24, 1996

Related U.S. Application Data

[63] Continuation of PCT/RU96/00210, Aug. 5, 1996.

[51] Int. Cl.[6] ...................................................... G06F 7/38
[52] U.S. Cl. ........................................................ 364/748.01
[58] Field of Search ...................... 364/748.01, 748.09, 364/748.14, 748.13

[56] References Cited

U.S. PATENT DOCUMENTS

| | | | |
|---|---|---|---|
| H1222 | 8/1993 | Brown et al. | 364/748.05 |
| 4,217,657 | 8/1980 | Handly et al. | 364/748.16 |
| 4,488,252 | 12/1984 | Vassar | 364/748 |
| 4,589,067 | 5/1986 | Porter et al. | 364/748 X |
| 4,683,547 | 7/1987 | DeGroot | 364/748 |
| 4,777,613 | 10/1988 | Shahan et al. | 364/748.16 |
| 4,839,846 | 6/1989 | Hirose et al. | 364/748.03 |
| 4,926,369 | 5/1990 | Hokenek et al. | 364/748.11 |
| 4,941,120 | 7/1990 | Brown et al. | 364/748.03 |
| 4,999,802 | 3/1991 | Cocanougher et al. | 364/748 |
| 5,117,384 | 5/1992 | Drehmel et al. | 364/748.11 |
| 5,136,536 | 8/1992 | Ng | 364/748 |
| 5,204,825 | 4/1993 | Ng | 364/715.04 |
| 5,241,490 | 8/1993 | Poon | 364/715.04 |

(List continued on next page.)

FOREIGN PATENT DOCUMENTS

| | | |
|---|---|---|
| A2 0110160 | 6/1984 | European Pat. Off. . |
| A2 0180048 | 5/1986 | European Pat. Off. . |
| A2 0394169 | 10/1990 | European Pat. Off. . |
| A1 2258666 | 8/1975 | France . |
| 2006915 C1 | 1/1994 | Russian Federation . |
| A1 1287144 | 1/1987 | U.S.S.R. . |
| A1 1367012 | 1/1988 | U.S.S.R. . |
| A1 1456949 | 2/1989 | U.S.S.R. . |

OTHER PUBLICATIONS

Benschneider, et al., "A Pipelined 50–MHz CMOS 64–bit Floating–Point Arithmetic Processor", *IEEE Journal of Solid–State Circuits*, vol. 24, No. 5, Oct. 1989, pp. 1317–1323.

Quach, et al., "An Improved Algorithm for High–Speed Floating–Point Addition", Stanford University Technical Report No. CSL–TR–90–442, Aug. 1990, pp. 1–17.

Hokenek, et al., "Second–Generation RISC Floating Point with Multiply–Add Fused", *IEEE Journal of Solid–State Circuits*, vol. 25, No. 5, Oct. 1990, pp. 1207–1213.

Ide, et al., "A 320–MFLOPS CMOS Floating–Point Processing Unit for Superscalar Processors", *IEEE Journal of Solid–State Circuits*, vol. 28, No. 3, Mar. 1993, pp. 352–361.

*Encyclopedia of Computer Science & Engineering*, Second Edition, Van Nostrand Reinhold Co., New York, NY, 1983, pp. 98–102, 1322–1324.

(List continued on next page.)

*Primary Examiner*—David Y. Eng
*Attorney, Agent, or Firm*—Skjerven, Morrill, MacPherson, Franklin & Friel; Michael Shenker

[57] ABSTRACT

A computer instruction execution unit includes different execution paths for different categories of instructions. Different execution paths share circuitry. The slower execution paths are pipelined. In some embodiments, all execution paths are pipelined. Fast instructions are executed by a fast execution path. Slower instructions are executed by a slower execution path. Faster instructions immediately following the slower instruction are also executed by the slower execution path not to block the shared circuitry. Consequently, the throughput is increased and the average instruction execution latency is reduced. When a sufficient number of clock cycles occur with no instructions started, subsequent fast instructions are executed by the fast execution path.

23 Claims, 10 Drawing Sheets

U.S. PATENT DOCUMENTS

| | | | |
|---|---|---|---|
| 5,247,471 | 9/1993 | Hilker et al. | 364/748 |
| 5,257,215 | 10/1993 | Poon | 364/745 |
| 5,260,889 | 11/1993 | Palaniswami | 364/748.05 |
| 5,267,186 | 11/1993 | Gupta et al. | 364/748.14 |
| 5,272,660 | 12/1993 | Rossbach | 364/748.01 |
| 5,282,156 | 1/1994 | Miyoshi et al. | 364/748 |
| 5,301,139 | 4/1994 | Zinger | 364/767 |
| 5,310,134 | 5/1994 | Hsu et al. | 244/3.12 |
| 5,317,527 | 5/1994 | Britton et al. | 364/716.06 |
| 5,337,265 | 8/1994 | Desrosiers et al. | 364/748.11 |
| 5,343,413 | 8/1994 | Inoue | 364/715.04 |
| 5,357,455 | 10/1994 | Sharangpani et al. | 364/767 |
| 5,390,134 | 2/1995 | Heikes et al. | 364/748.03 |
| 5,463,574 | 10/1995 | Desrosiers et al. | 364/748.01 |
| 5,481,686 | 1/1996 | Dockser | 395/563 |
| 5,493,520 | 2/1996 | Schmookler et al. | 364/715.1 |
| 5,504,912 | 4/1996 | Morinaga et al. | 395/800.34 |
| 5,511,016 | 4/1996 | Béchade | 364/748.03 |
| 5,528,525 | 6/1996 | Suzuki | 364/715.08 |

OTHER PUBLICATIONS

Gwennap, et al., "UltraSparc Unleashes SPARC Performance, Next–Generation Design Could Put Sun Back in Race" *Microprocessor Report*, vol. 8, No. 13, Oct. 3, 1994, pp. 1–10.

Hokenek et al., "Leading–Zero Anticipator (LZA) in the IBM RISC System/6000 Floating–Point Execution Unit," *IBM J. Res. Develop.*, vol. 34, No. 1, Jan., 1990, pp. 71–77.

Montoye, et al., "Design of the IBM RISC System/6000 Floating–Point Execution Unit," *IBM J. Res. Develop.*, vol. 34, No. 1, Jan. 1990, pp. 59–70.

LSI Logic Databook and Design Manual, 5th Ed., HCMOS Macrocells, Macrofunctions, Oct. 1986, pp. 12–1 to 12–28.

Quach et al., "Leading One Prediction—Implementation, Generalization, and Application, Technical Report: CSL–TR–91–463," Computer System Laboratory, Stanford University, Mar. 1991, pp. 1–12.

"IEEE Standard for Binary Floating–Point Arithmetic," Institute of Electrical and Electronics Engineers, Inc., New York, NY, ANSI/IEEE Std. 754, Nov. 1994, pp. 1–18.

"IC Master 3. Advertisers Technical Data; LSI Logic Products and Services," *Hearst Business Communications, Inc.*, IC Master, 1991, pp. 3529–3532.

The SPARC Architecture Manual, Version 8, (SPARC International, Inc., Prentice–Hall, Inc., New Jersey, 1992), pp. 1–316.

Kahan, W., et al., "A Proposed IEEE–CS Standard for Binary Floating Point Arithmetic", Proceedings of the computer Science and Statistics: 12th Annual Symposium on the Interface, May 10–11, 1979, University of Waterloo, Waterloo, Ontario, Canada, pp. 32–36.

Yu, R.K., et al., "167 Mhz Radix–4 Floating Point Multiplier", Proceedings of the Twelfth Symposium on Computer Arithmetic (IEEE 1995), pp. 149–154.

Weste, Neil H.E., et al., "Principles of CMOS VLSI Design—A Systems Perspective" (Addison–Wesley Publishing Co., 2nd Ed., 1993), p. 532.

Hicks, T.N., et al., "POWER2 Floating–Point Unit: Architecture and Implementation", *IBM J. Res. Develop.*, vol. 38, No. 5, Sep. 1994, pp. 525–536.

Omondi, A.R., "Computer Arithmetic Systems: Algorithms, Architecture and Implementation", 1994, pp. 76–86.

| operation type | cycle 1 | cycle 2 | cycle 3 | cycle 4 | cycle 5 | cycle 6 | cycle 7 |
|---|---|---|---|---|---|---|---|
| usual instruction | carry save addition | addition and rounding | | | | | |
| usual instruction | | carry save addition | addition and rounding | | | | |
| unusual instruction | | | addition and rounding | addition | shifting and rounding | | |
| usual instruction | | | carry save addition | carry save addition | addition | rounding | |
| no instruction | | | | | | | |
| usual instruction | | | | | | carry save addition | addition and rounding |

FIG. 2

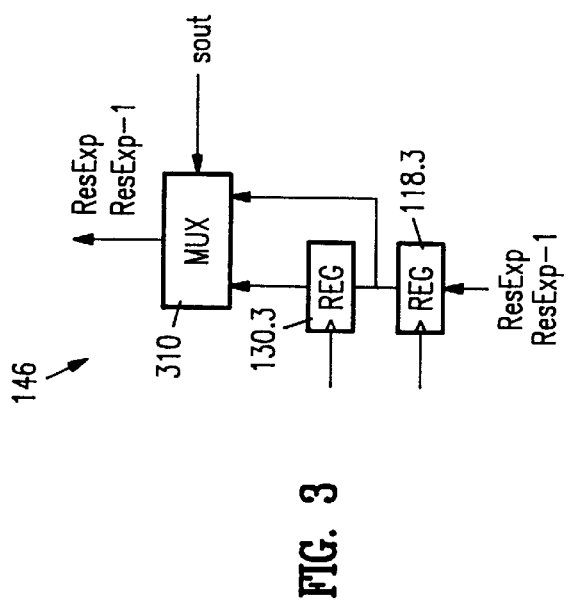

| res_nrm | res_inf | res_zero | MSBF | OVF | OVF_c | excep | RMC | Result |
|---|---|---|---|---|---|---|---|---|
| 1 | 0 | 0 | 1 | 0 | 0 | 0 | 000 | FAD |
| 1 | 0 | 0 | 0 | 0 | 0 | 0 | 001 | FAD<<1 |
| 0 | 0 | 0 | 0 | 0 | 0 | 0 | 001 | FAD<<1 |
| 0 | 1 | 0 | X | 0 | 0 | 0 | 100 | ∞ |
| 0 | 0 | 1 | X | 0 | 0 | 0 | 101 | zero |
| 0 | 0 | 0 | X | 1 | 0 | 0 | 110 | OVFL |
| 0 | 0 | 0 | 1 | 0 | 1 | 0 | 110 | OVFL |
| X | X | X | X | X | X | 1 | 111 | NaN |

FIG. 8

| res_nrm_d1 | res_inf_d1 | res_zero_d1 | MSBR | OVF_d1 | OVF_c_d1 | UNF_d1 | UNF_c_D1 | excep | RMC | Result |
|---|---|---|---|---|---|---|---|---|---|---|
| 1 | 0 | 0 | 1 | 0 | 0 | 0 | 0 | 0 | 010 | RAD |
| 0 | 0 | 0 | X | 0 | 0 | 1 | 0 | 0 | 010 | RAD |
| 0 | 0 | 0 | X | 0 | 0 | 0 | 1 | 0 | 010 | RAD |
| 1 | 0 | 0 | 0 | 0 | 0 | 0 | 0 | 0 | 011 | RAD<<1 |
| 0 | 0 | 0 | X | 0 | 0 | 0 | 0 | 0 | 011 | RAD<<1 |
| 0 | 1 | 0 | X | 0 | 0 | 0 | 0 | 0 | 100 | ∞ |
| 0 | 0 | 1 | 0 | 0 | 0 | 0 | 0 | 0 | 101 | zero |
| 0 | 0 | 0 | 1 | 1 | 0 | 0 | 0 | 0 | 110 | OVFL |
| 0 | 0 | 0 | X | 0 | 1 | 0 | 0 | 0 | 110 | OVFL |
| X | X | X | X | X | X | X | X | 1 | 111 | NaN |

FIG. 9

| Result symbol | Round mode | Result sign | Single/ Double | Exp (bin) | Fraction 23 msb | Fraction 29 lsb |
|---|---|---|---|---|---|---|
| NaN | X | X | S | 00011111111 | 111...11 | 000...000 |
|  |  |  | D | 11111111111 | 111...11 | 111...111 |
| ∞ | X | X | S | 00011111111 | 000...00 | 000...000 |
|  |  |  | D | 11111111111 | 000...00 | 000...000 |
| zero | X | X | X | 00000000000 | 000...00 | 000...000 |
| OVFL | to nearest | X | S | 00011111111 | 000...00 | 000...000 |
|  |  |  | D | 11111111111 | 000...00 | 000...000 |
|  | toward zero | X | S | 00011111110 | 111...11 | 000...000 |
|  |  |  | D | 11111111110 | 111...11 | 111...111 |
|  | toward +∞ | 1 | S | 00011111110 | 111...11 | 000...000 |
|  |  |  | D | 11111111110 | 111...11 | 111...111 |
|  |  | 0 | S | 00011111111 | 000...00 | 000...000 |
|  |  |  | D | 11111111111 | 000...00 | 000...000 |
|  | toward −∞ | 1 | S | 00011111111 | 000...00 | 000...000 |
|  |  |  | D | 11111111111 | 000...00 | 000...000 |
|  |  | 0 | S | 00011111110 | 111...11 | 000...000 |
|  |  |  | D | 11111111110 | 111...11 | 000...000 |
| FAD | X | X | S | ResExp | FAD[104:82] | 000...000 |
|  |  |  | D | ResExp | FAD[104:53] | |
| FAD<<1 | X | X | S | ResExp−1 | FAD[103:81] | 000...000 |
|  |  |  | D | ResExp−1 | FAD[103:52] | |
| RAD | X | X | S | ResExp | RAD[52:30] | 000...000 |
|  |  |  | D | ResExp | RAD[52:1] | |
| RAD<<1 | X | X | S | ResExp−1 | RAD[51:29] | 000...000 |
|  |  |  | D | ResExp−1 | RAD[51:0] | |

FIG. 10

EXECUTING COMPUTER INSTRUCRIONS BY CIRCUITS HAVING DIFFERENT LATENCIES

The present application is a continuation of PCT application no. PCT/RU96/00210 designating the United States of America, filed Aug. 5, 1996 by V. Y. Gorshtein et al. and entitled "APPARATUS AND METHODS FOR EXECUTION OF COMPUTER INSTRUCTIONS".

BACKGROUND OF THE INVENTION

The present invention relates to execution of computer instructions.

An important goal in computer design is increasing the computer throughput, that is, the number of computer instructions completed per clock cycle. Another important goal is reducing the instruction execution latency.

In the past, throughput and latency have been improved by parallelism, that is, by making instruction execution units perform different operations in parallel. For example, in some floating point multipliers, generation of the exponent of the result is done in parallel with multiplication of the significands of the operands. It is desirable to further increase parallelism in order to improve throughput and latency.

In the past, multiplication involving denormalized numbers required special processing which was done by software. Software processing reduced multiplier speed. To increase the speed, some multipliers replaced denormalized numbers by zero. This, however, resulted in a loss of precision. Therefore, it is desirable to do full processing of denormalized numbers by hardware to achieve a high speed without a loss of precision.

SUMMARY

In many computers, the same execution unit executes instructions that require different amounts of processing. Because instructions require different amounts of processing, some of the instructions could be executed faster than other instructions. For example, in a floating point multiplier, some instructions do not need a shift for normalization or they need a shift by at most one digit. Such instructions could be executed faster than instructions requiring longer shifts. The slower instructions requiring longer shifts can delay fast instructions and subsequent slower instructions. As a result, throughput is reduced and latency is increased.

The present invention provides in some embodiments instruction execution units that execute variable-execution-time instructions and have high throughput and low latency.

In some embodiments, the improved throughput and latency are achieved as follows. Instructions executed by the execution unit are divided into two or more categories. Instructions in the same category can be executed in the same amount of time, for example, the same number of clock cycles. Instructions in different categories may require different time for their execution. Thus, some categories are "faster" (i.e., include instructions that can be executed faster) than other categories.

The execution unit includes a separate execution path for each category of instructions. Different paths share circuitry to achieve lower cost and circuit area. Slower execution paths, which execute slower instructions, are pipelined. In some embodiments, all execution paths are pipelined.

Instructions of a fast category are initially executed by a fast execution path. When a slower instruction is encountered, it is executed by a slower path. If the slower instruction is immediately followed by a fast instruction, the fast instruction is also executed by the slower path rather than waiting in the fast path for the slower instruction. Consequently, the fast instruction does not block the circuitry shared by the two paths, and the instruction flow arriving at the execution unit does not have to be suspended. The execution unit throughput is increased as a result, and the latency is reduced.

In some embodiments, the execution unit is a floating point multiplier. The multiplication instructions executed by the multiplier are divided into two categories: "usual" instructions and "unusual" instructions. The usual instruction category includes only instructions for which normalization may require a shift by at most one digit, and denormalization is not required. (Normalization is a left shift eliminating leading non-significant digits or a right shift performed to correct the result for overflow. Denormalization is a right shift performed to increase the exponent of the result up to a minimal value.) For example, in some embodiments the usual instructions include instructions in which both operands are normalized and the sum of the operands' exponents, when adjusted for the exponent bias, is greater than the minimal exponent of a normalized number. In some embodiments, the usual instructions include also instructions in which any operand is infinity or zero. The unusual instructions are instructions for which normalization may require a shift by more than one digit or denormalization is required. The unusual instructions take more clock cycles to execute. In some embodiments, an unusual instruction takes four cycles, and a usual instruction takes three cycles; a new instruction can be started every cycle. The two execution paths for the usual and unusual instructions share circuitry that multiplies the operands' significands. The slow path (for the unusual instructions) includes a shifter that can perform normalization/denormalization shifts by more than one digit. The shifter is not part of the fast execution path. The usual instructions immediately following an unusual instruction are executed in the slow execution path (with the shifter performing a shift by zero digits) not to block the shared circuitry and thus to allow a new instruction to start every cycle. When a cycle occurs in which no instruction is started, usual instructions immediately following that cycle are executed by the fast execution path.

In many applications, most instructions are usual instructions. Therefore, in many applications only a small portion of instructions is executed by the slow execution path.

Other features and advantages of the invention are described below. The invention is defined by the appended claims.

BRIEF DESCRIPTION OF THE DRAWINGS

FIG. 2 is a table illustrating instruction execution timing in the multiplier of FIG. 1.

FIG. 3 is a circuit diagram of a portion of the multiplier of FIG. 1.

FIG. 5 is a table illustrating how signals generated by the circuit of FIG. 4 are related to each other and to the result of the multiplication.

FIGS. 8–10 are tables of signals in the multiplier of FIG. 1.

DESCRIPTION OF PREFERRED EMBODIMENTS

Figure 1:
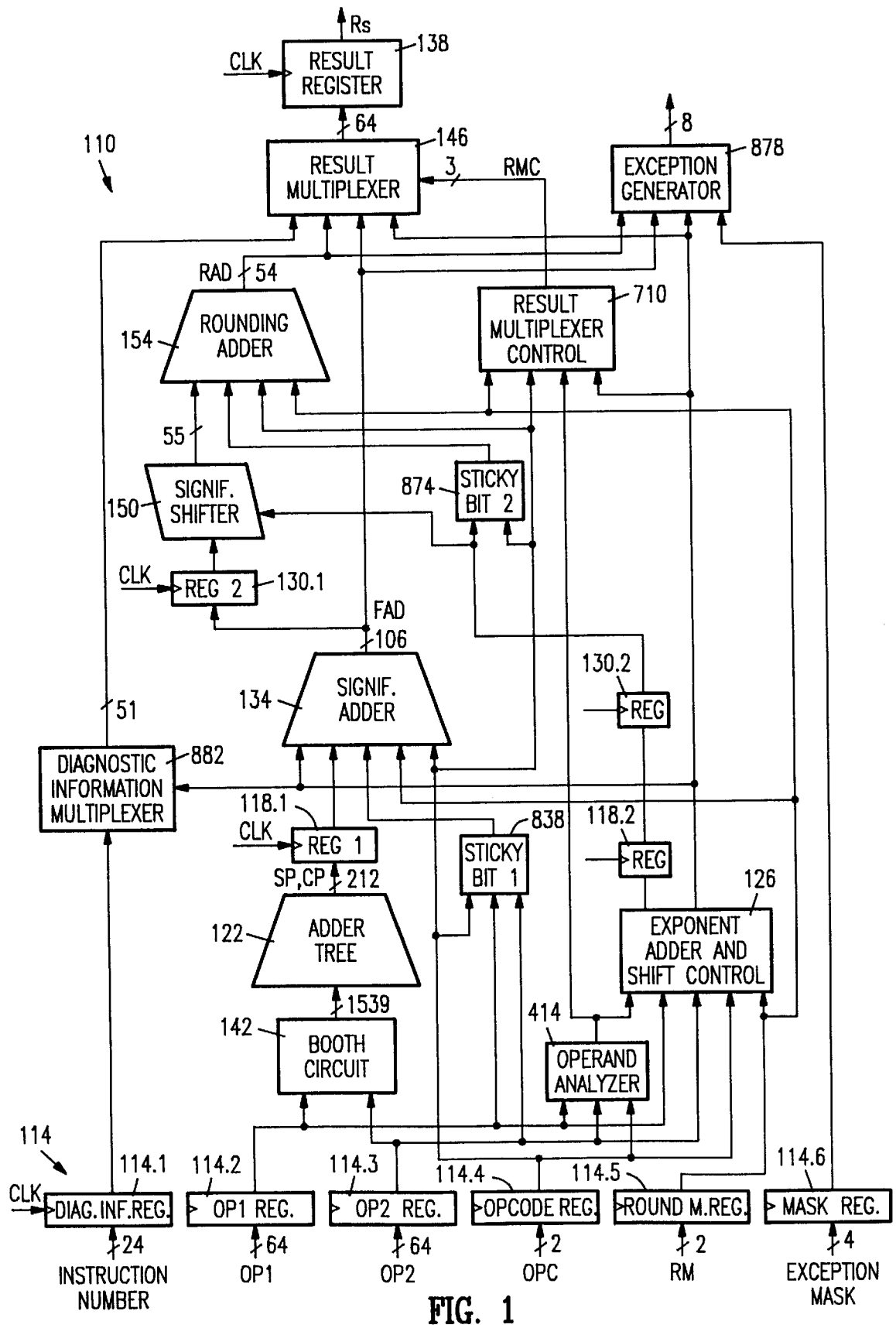
FIG. 1 is a block diagram of a floating point multiplier according to the present invention.

FIG. 1 is a block diagram of pipelined floating-point multiplier 110 which includes two execution paths. The fast execution path executes instructions for which normalization requires a shift by at most one digit and no denormalization is required. The slow execution path executes the remaining instructions. The circuitry shared by the two paths includes: 1) a circuit which multiplies the operands' significands and which includes Booth circuit 142, Wallace tree adder 122, and significand adder 134; 2) result multiplexer 146 which selects the result from the fast or slow execution path and which performs a one-digit normalization shift when needed; 3) result multiplexer control circuit 710; 4) exponent adder and shift control ("EASC") circuit 126 which generates the result exponents and also generates the shift direction and shift amount for normalization/denormalization shifter 150; and 5) operand analyzer 414. The slow execution path includes also: 1) significand shifter 150 which can perform normalization or denormalization shifts by more than one digit; and 2) rounding adder 154.

Both execution paths are pipelined. The registers defining the pipeline stages include: 1) input register 114 which includes registers 114.1 through 114.6; 2) registers 118, including registers 118.1, 118.2 at the outputs of adder 122 and EASC 126, respectively; 3) registers 130, including registers 130.1, 130.2 at the outputs of significand adder 134 and register 118.2 respectively; and 4) result register 138. These registers are clocked by the same clock CLK.

The first pipeline stage includes circuitry between register 114 and registers 118. In this stage, Booth circuit 142 receives the significands of operands OP1, OP2 from input registers 114.2, 114.3 and generates partial products of the significands. In the same stage, Wallace carry-save adder 122 adds the partial products and generates carry-save vectors SP, CP.

In the second pipeline stage, significand adder 134 connected to the output of register 118.1 adds the two carry-save vectors and provides their sum FAD to result multiplexer 146 and to pipeline register 130.1.

Result multiplexer 146 selects the output of fraction adder 134 only when result normalization requires a shift by at most one digit and denormalization is not required. Result multiplexer 146 performs such a one-digit normalization shift if needed, and provides the result to result register 138. Rounding is performed by adder 134 taking this shift into account. Thus, only two pipeline stages are used to generate the result, and the result is provided on the output Rs in the third clock cycle after the operands appear on the inputs of register 114 (the first clock cycle being the cycle in which adder 122 perform the addition). The third pipeline stage used for longer normalization shifts and for denormalization shifts is omitted.

In the third pipeline stage, significand shifter 150 shifts the output of adder 134 to perform normalization or denormalization. Rounding adder 154 rounds the output of shifter 150 and provides the rounded result RAD to result multiplexer 146. If result multiplexer 146 selects the output RAD of adder 154, the result Rs is provided in the fourth clock cycle.

In some embodiments, some instructions with at most 1-digit normalization shifts are placed in the slow category to simplify the circuitry that determines whether the instruction is to be executed in 3 or 4 cycles. This circuitry is part of EASC 126 and is described below.

Fast instructions immediately following a slow instruction are executed in four cycles not to block the pipeline. More particularly, if a fast instruction immediately follows a slow instruction, significand adder 134 provides the significand product FAD for the fast instruction at the same time as rounding adder 154 provides the significand product RAD for the slow instruction. Result multiplexer 146 selects the output RAD of rounding adder 154. To free the significand adder 134 for the next instruction, the output FAD of adder 134 is latched by register 130.1 and goes through the third pipeline stage. Thus, all the instructions immediately following a slow instruction are executed in four cycles. As a result, multiplier 110 is able to start a new instruction every clock cycle. For four-cycle instructions, an instruction termination signal (not shown) is delivered to the processor control circuitry (not shown) one cycle later than for three-cycle instructions.

When a clock cycle occurs in which no multiplication instruction is started, subsequent fast instructions are executed again in three cycles until a slow instruction occurs.

In some embodiments, the fast category includes all the instructions for which 1) both operands OP1, OP2 are normalized and 2) the sum of the operands' exponents is greater than the minimum exponent. (In the previous sentence, the sum of the exponents means the sum adjusted for the exponent bias if a biased exponent format is used.) Such instructions need a 1-digit normalization shift or no shift at all. In many applications, most multiplication instructions are such instructions. Hence, most multiplication instructions can be performed in three clock cycles, and only a small portion of multiplication instructions is performed in four cycles.

An example timing for one such embodiment is given in FIG. 2. In FIG. 2, fast instructions are called "usual", and slow instructions are called "unusual". In clock cycle 1, adder 122 performs a carry-save addition for a usual instruction. In cycle 2, significand adder 134 performs addition and rounding for the same instruction. In cycle 3, the result of the instruction will be provided on output Rs (this is not shown in FIG. 2). In cycle 2, another usual instruction goes through the carry-save addition stage. This instruction will be completed in 3 cycles like the previous instruction.

In cycle 3, an unusual instruction goes through the carry-save addition stage. For that instruction, significand adder 134 performs the addition in cycle 4, and shifter 150 and rounding adder 154 perform, respectively, shifting and rounding in cycle 5. The result will be provided on output Rs in cycle 6.

In cycle 4, another usual instruction is in the carry-save addition stage. This instruction will take four cycles because it immediately follows an unusual instruction.

No instruction is in the carry-save addition stage in cycle 5. Therefore, a usual instruction which is in the carry-save addition stage in cycle 6 will be completed in 3 cycles.

The throughput increase and the latency reduction are illustrated by the following Tables 1 and 2. Table 1 shows the instruction timing for the multiplier 110 of FIG. 1. Table 2 shows the instruction timing for a similar multiplier in which a usual instruction immediately following an unusual instruction does not go through the third stage but waits until the unusual instruction is completed. In Tables 1 and 2, unusual instruction UN1, usual instruction US1, and unusual instruction UN2 are started in respective cycles 1, 2 and 3. In Table 1, instruction US1 goes through all the three pipeline stages because it immediately follows an unusual instruction. The instructions' results appear on output Rs in respective cycles 5, 6 and 7.

In Table 2, during cycle 5, the result of instruction UN1 is provided on the output Rs. Instruction US1 does not go through the third stage but waits in the second stage. Therefore, instruction UN2 has to wait in the first stage in cycle 5 rather than going through the second stage as in Table 1. Hence the result of instruction UN2 appears on output Rs one cycle later than in Table 1. Thus, the throughput is reduced and the execution latency of instruction UN2 is increased. In Table 2, no new instruction is started in cycle 5. Therefore, the instructions immediately following the instruction UN2 will also be delayed.

TABLE 1

| | | Pipeline stages | | | |
|---|---|---|---|---|---|
| cycle | input | 1st | 2nd | 3rd | output |
| 1 | UN1 | | | | |
| 2 | US1 | UN1 | | | |
| 3 | UN2 | US1 | UN1 | | |
| 4 | | UN2 | US1 | UN1 | |
| 5 | | | UN2 | US1 | UN1 |
| 6 | | | | UN2 | US1 |
| 7 | | | | | UN2 |

TABLE 2

| | | Pipeline stages | | | |
|---|---|---|---|---|---|
| cycle | input | 1st | 2nd | 3rd | output |
| 1 | UN1 | | | | |
| 2 | US1 | UN1 | | | |
| 3 | UN2 | US1 | UN1 | | |
| 4 | | UN2 | US1 | UN1 | |
| 5 | | UN2 | US1 | | UN1 |
| 6 | | | UN2 | | US1 |
| 7 | | | | UN2 | — |
| 8 | | | | | UN2 |

To reduce the execution time, the right and left shift amounts for shifter 150 are generated by EASC 126 in the first pipeline stage in parallel with generation of vectors SP, CP by circuits 142, 122. The shift amounts are latched by register 118.2, and then by register 130.2 which provides them to shifter 150 at the start of the instruction's third cycle.

EASC 126 provides to multiplexer 146 possible result exponents ResExp, ResExp-1. See FIG. 3 illustrating a portion of multiplexer 146. The actual result exponent will depend on whether multiplexer 146 will perform a one-digit normalization shift. The two possible exponents are latched by register 118.3 and then by register 130.3. The outputs of registers 118.3, 130.3 are connected to data inputs of multiplexer 310. The select input of multiplexer 310 receives a signal sout indicating whether the result multiplexer 146 is executing a 3-cycle or a 4-cycle instruction. If the instruction is a 3-cycle instruction, multiplexer 310 selects the output of register 118.3. Otherwise, multiplexer 310 selects the output of register 130.3. Registers 118.3, 130.3 are clocked by signal CLK.

Some embodiments have different numbers of pipeline stages and/or pipeline resisters. The exact position of pipeline registers is also different in some embodiments. While in multiplier 110 of FIG. 1 all instructions are divided into two categories—fast and slow—in some other embodiments the instructions are divided into more than two categories. Instructions in different categories may require a different number of clock cycles for their execution. For example, in some embodiments, one category may include fast instructions in which: 1) normalization or denormalization may require a shift by at most one digit, or by at most two digits, or by at most some other number of digits, and/or 2) rounding is not required or requires at most a simple operation such as truncation. Other categories include slower instructions in which normalization, denormalization, and/or rounding are more complex. The fast instructions initially follow a fast execution path (such as the path from adder 134 directly to multiplexer 146 in FIG. 1). When a slower instruction is encountered, the execution is switched to a slower path for the slower instruction and for subsequent instructions in the same and faster categories. If a still slower instruction is encountered, the execution is switched to a still slower path. When a sufficient number of clock cycles accumulate in which no instruction is started, the execution is switched to a faster path. If possible, the execution is switched to the fastest possible path.

The operation of multiplier 110 will now be illustrated on the example of IEEE Standard 754 described in "IEEE Standard for Binary Floating-Point Arithmetic" (American National Standards Institute 1985) hereby incorporated herein by reference. Multiplier 110 performs "single format" multiplication instructions on single format operands and "double format" instructions on double format operands, and provides respectively a single or double format result Rs. In both formats, a floating point number $(-1)^s 2^E (h \cdot f)$ is represented in a computer memory by 1-bit sign s immediately followed by biased exponent e which is immediately followed by fraction f. Hidden bit h is not included in the representation. For normalized numbers:

$h=1$, $e=E+BIAS$, $1 \leq e \leq ExpMax$, where BIAS and ExpMax are predefined constants.

If a number is too small in magnitude to be represented as a normalized number, it is represented as either a denormalized number or 0. In both cases:

$h=0$, $E=1-BIAS$, $e=0$.

For denormalized numbers, the fraction $f \neq 0$. For zero numbers, $f=0$.

In the double format, each number is represented in a 64-bit field: fraction f is 52 bits long, and exponent e is 11 bits long. BIAS=1023, and ExpMax=2046. In the single format, f is 23 bits long, e is 8 bits long, BIAS=127, and ExpMax=254. In both formats the value e=ExpMax+1 is used to represent infinity or NaN ("not a number"), as described in "IEEE Standard for Binary Floating-Point Arithmetic", cited above.

In FIG. 1, operand registers 114.2, 114.3 are 64-bit registers. Single-format operands are represented in a 64-bit field as follows. The sign s is in the most significant bit, i.e., bit 63 (bits are numbered starting from the least significant bit which is bit number 0). The exponent e occupies the next eleven bits [62:52]. The exponent is aligned so that the least significant bit of the exponent is in the least significant bit 52 of the 11-bit field. Fraction f occupies the remaining 52 bits.

The most significant bit of the fraction is in the most significant bit 51 of the 52-bit field.

Opcode register 114.4 receives opcode OPC which specifies whether the instruction is a single or double format instruction. Register 114.5 receives the rounding mode RM which is one of the four modes specified by IEEE Standard 754 ("round to nearest", "round toward plus infinity", "round toward minus infinity", or "round toward 0").

Booth circuit 142 generates 27 partial products of 53-bit significands hf of operands OP1, OP2 according to the radix-4 Booth method. Each partial product is 57 bits long. The 57 bits include: 54 bits for a possibly shifted multiplier significand, two sign bits, and one least significant bit (LSB) appended for the case when the previous partial product was negative. In addition, there is a hidden zero bit between the LSB and the other 56 bits of the partial product. Of the two signed bits, the less significant bit is an exclusive OR of the signs of the partial product itself and all the previous partial products (if any). The more significant sign bit is an OR of the sign of the partial product itself and the signs of all the previous partial products (if any). If the immediately preceding partial product is negative, the 54 bits of the immediately preceding partial product that follow the sign bits are complemented, and the LSB of the current partial product is set to 1. Otherwise, the LSB is 0.

Adder 122 adds the partial products and generates two 106-bit vectors SP, CP. Significand adder 134 adds SP and CP and generates one-vector significand product FAD. If the instruction is to be completed in 3 cycles, adder 134 rounds the product. If the instruction is to be completed in 4 cycles, adder 134 does not round the product; rounding will be performed by rounding adder 154.

Figure 4:
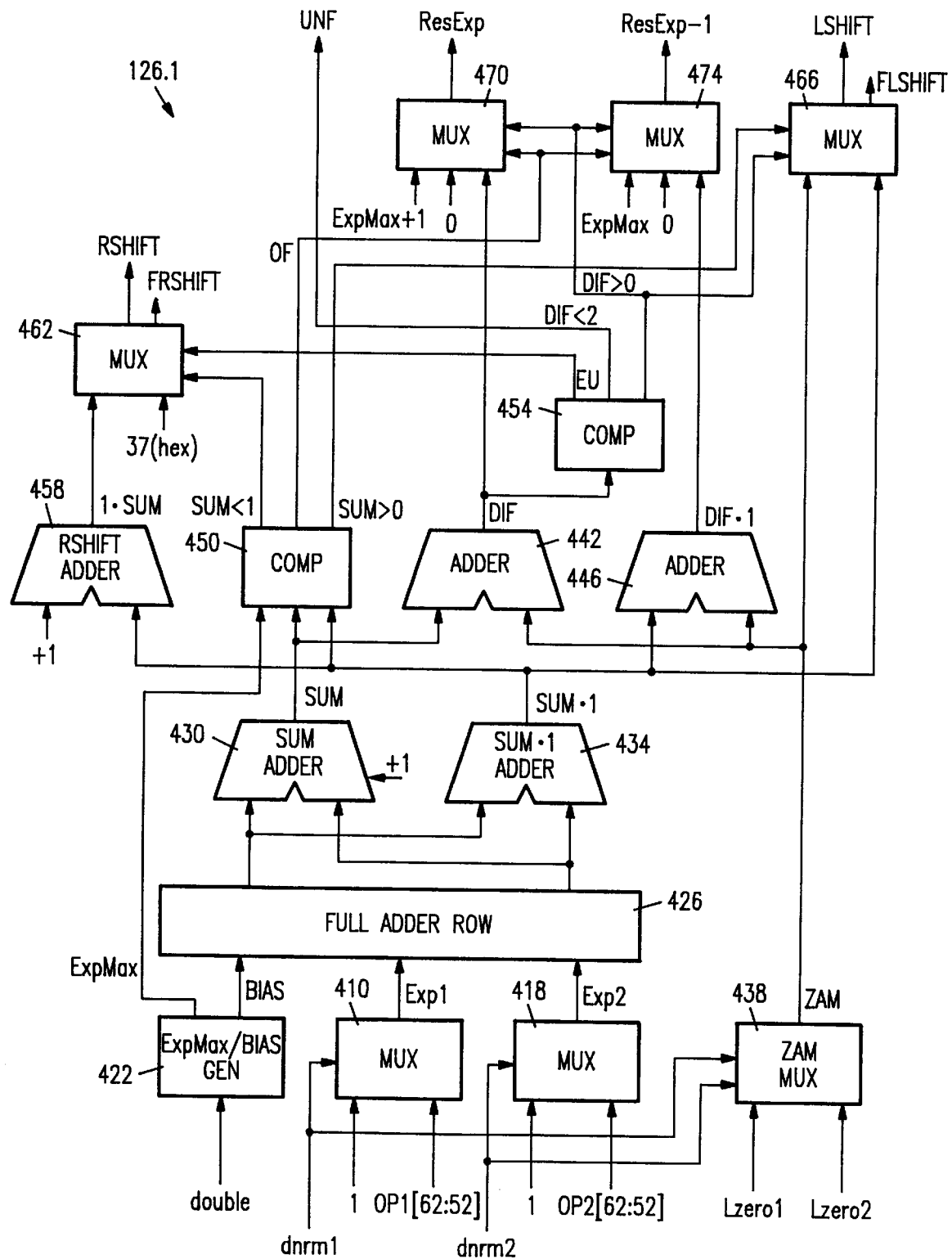
FIG. 4 is a block diagram of a portion of the multiplier of FIG. 1.

FIG. 4 is a block diagram of a portion 126.1 of EASC 126 of FIG. 1. Circuit 126.1 generates the possible result exponents ResExp, ResExp-1 and also generates right-shift-amount signal RSHIFT and left-shift-amount signal LSHIFT for significand shifter 150. Circuit 126.1 operates in the first pipeline stage.

In circuit 126.1, multiplexer 410 generates signal Exp1 representing the exponent of operand OP1. The select input of multiplexer 410 receives signal dnrm1 indicating whether operand OP1 is denormalized. If dnrm1 is deasserted, the operand is normalized, and multiplexer 410 selects the operand's exponent OP1[62:52]. If dnrm1 is asserted, multiplexer 410 selects Exp1=1. Signal dnrm1 is generated by operand analyzer 414 (FIG. 1) using methods known in the art.

Similarly, based on signal dnrm2 generated by operand analyzer 414, multiplexer 418 selects Exp2=OP2[62:52] if operand OP2 is normalized, and Exp2=1 if not.

ExpMax/BIAS generator 422 receives from OPC register 114.4 a signal double indicating whether the instruction in the first pipeline stage is a double-format instruction. Generator 422 generates the maximum exponent ExpMax and the signal −BIAS according to the following Table 3. −BIAS is in two's complement form. In the description of EASC 126, two's complement form is assumed unless stated otherwise.

TABLE 3

|  | double format | single format |
|---|---|---|
| ExpMax | 7fe (hex) | 0fe (hex) |
| −BIAS | 401 (hex) | 781 (hex) |

A row of full adders 426 performs bitwise addition and generates the carry and sum vectors for Exp1+Exp2−BIAS Adder 430 sets the least significant bit of the carry vector to 1 and adds the sum vector, thus generating SUM=Exp1+Exp2+1−BIAS.

Adder 434 adds the carry and sum vectors and thus generates

SUM-1=Exp1+Exp2−BIAS.

SUM will be the result exponent if the result Rs is normalized and FAD[105]=1. In this case, FAD[105] is the hidden bit of the result significand, and FAD[104] is the most significant bit of the result fraction. SUM-1 is the result exponent if: (i) the result Rs is normalized, (ii) FAD[105]=0, and (iii) FAD[104]=1. In this case, multiplexer 146 shifts FAD left by one bit.

Multiplexer 438 generates a signal ZAM indicative of the number of leading zeroes in the significand product FAD. ZAM is selected from signals Lzero1, Lzero2 generated by operand analyzer 414. Lzero1 is the number of leading zeroes in the significand hf of operand OP1. Lzero2 is the number of leading zeroes in the significand of operand OP2. The select inputs of multiplexer 438 receive signals dnrm1, dnrm2. The output ZAM of multiplexer 438 is equal to the input Lzero1 or Lzero2 corresponding to a denormalized operand. If both operands are normalized, ZAM=0. If both operands are denormalized, ZAM is the OR of Lzero1 and Lzero2 and thus is at least as large as Lzero1 and Lzero2; an "extreme underflow" occurs, and result multiplexer 146 selects the result based on the sticky bit, the operands' signs, and the rounding mode RM. The result is generated in four cycles. The sign of the result is the exclusive OR of the signs of the operands. The result is the smallest positive denormalized number if the result sign is plus, the rounding mode is "toward plus infinity", and the sticky bit is 1. The result is the largest negative denormalized number (the smallest in magnitude negative denormalized number) if the result sign is minus, the rounding mode is "toward minus infinity", and the sticky bit is 1. In the remaining cases, the result is 0.

Adders 442, 446 generate respectively the signals DIF, DIF-1 which are possible exponent values for the case when the multiplication result Rs is normalized whether or not the operands are normalized. More particularly, adder 442 receives SUM and ZAM and generates

DIF=SUM−ZAM.

If the result Rs is normalized, DIF is the result exponent in the case MSBP=1 where MSBP is the most significant bit of the product of the significant portions of the significands of the operands OP1, OP2. For 3-cycle instructions, MSBP=MSBF where:

MSBF=FAD[105].

For 4-cycle instructions:

MSBP=MSBR=RAD[53].

Adder 446 receives SUM-1 and ZAM and generates

DIF-1=(SUM-1)−ZAM.

If the result Rs is normalized, DIF-1 is the result exponent if MSBP=0.

Comparator 450 receives ExpMax, SUM and SUM-1 and generates the following signals:

1) SUM<1 which means that the product significand has to be shifted right by shifter 150.
2) SUM>0 which means that FAD may be shifted left by zero or more bits if needed.
3) OF=(SUM>ExpMax).

Comparator 454 receives DIF and generates the following signals:

1) Extreme underflow signal EU=(DIF<1fcc (hex)). 1fcc (hex)=−52 (decimal) in two's complement form. EU means that no significant digits of FAD will appear in the result if the result is shifted right to bring the exponent up to its minimum value of 1. In some embodiments, comparator 450 receives also the signal double and generates EU=(DIF<1fcc (hex)) for double format instructions and EU=(DIF<f9 (hex)=−23 (decimal)) for single format instructions.
2) DIF>0 means that the result is possibly normalized whether or not both operands are normalized.
3) UNF=(DIF<2). UNF means an underflow or a conditional underflow. A conditional underflow is the condition DIF=1. If DIF=1, then: (a) if MSBP=0, the result is not normalized, (b) if MSBP=1 the result is normalized.

Adder 458 receives SUM-1 and generates the possible right shift amount 1-SUM. This shift amount is generated by complementing "SUM-1" and adding 1 to the complement.

Multiplexer 462 generates the right shift amount RSHIFT. If signal EU is reset, RSHIFT is set to the output "1-SUM" of adder 458. If EU is set (an extreme underflow), RSHIFT is set to 37 (hex). The shift amount of 37(hex) guarantees that FAD will be shifted out of the fraction field of the result even in a double format instruction.

Multiplexer 462 also generates the right shift flag FRSHIFT that a right shift is needed. FRSHIFT is set to output "SUM<1" of comparator 450.

Multiplexer 466 receives signals ZAM, "SUM-1", "DIF>0" and "SUM>0". Multiplexer 466 generates the left shift amount LSHIFT and the flag FLSHIFT="SUM>0" that a left shift by zero or more digits may be performed if needed. If DIF>0, LSHIFT=ZAM. If not, LSHIFT=SUM-1.

Multiplexer 470 generates the result exponent signal ResExp for the case MSBP=1. Multiplexer 474 generates the result exponent signal "ResExp-1" for the case MSBP=0. The two result exponents are generated in accordance with FIG. 5. The data inputs of multiplexer 470 are ExpMax+1, 0, and DIF. The data inputs of multiplexer 474 are ExpMax, 0, "DIF-1". The select inputs of each multiplexer receive OF="SUM>ExpMax" and "DIF>0".

Figure 6:
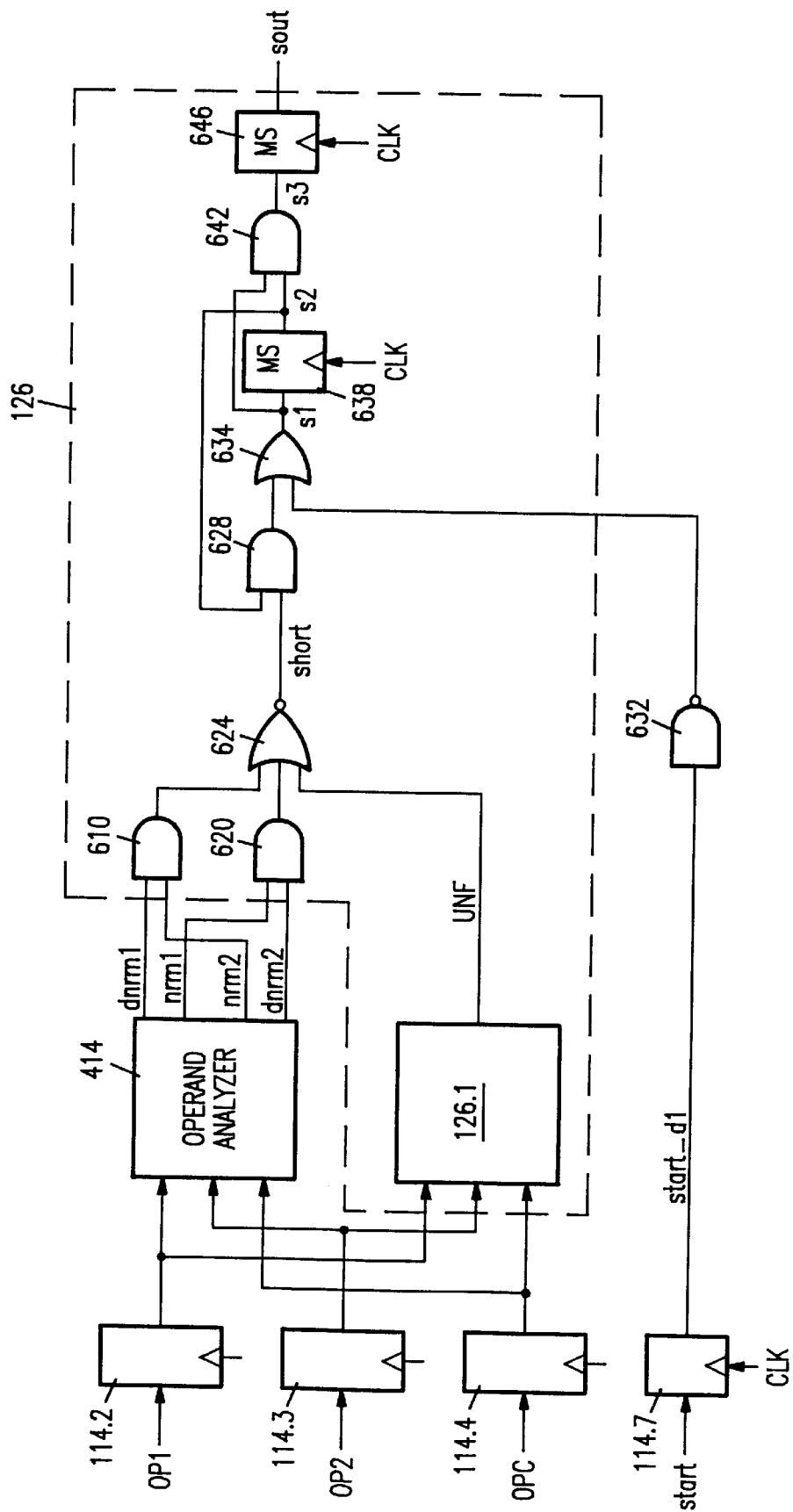
FIG. 6 is a diagram of a portion of the multiplier of FIG. 1.

FIG. 6 shows a circuit generating the signal sout controlling the result multiplexer 146. The circuit of FIG. 6 is a portion of EASC 126. If sout=0, multiplexer 146 selects the output RAD of rounding adder 154, and the instruction completes in four cycles. If sout=1, multiplexer 146 selects the output FAD of adder 134, and the instruction completes in three cycles.

As shown in FIG. 6, operand analyzer 414 generates signals nrm1, nrm2 which are set if the respective operand OP1 or OP2 is normalized. Thus, nrm1=1 means ExpMax≧OP1[62:52]>0.

Similarly, nrm2=1 means

ExpMax≧OP2[62:52]>0.

AND gates 610, 620 generate respective products "dnrm1 & nrm2", "nrm1 & dnrm2". NOR gate 624 generates the signal short=NOT(dnrm1 & nrm2|nrm1 & dnrm2|UNF).

"&" is logical AND, "|" is logical OR. If short=1, the instruction is usual and can be executed in three cycles. If short=0, the instruction is unusual.

Signal short is delivered to one input of AND gate 628.

Signal start is asserted at the start of a multiplication instruction. This signal is latched in register 114.7 which is part of input register 114. Signal start is latched simultaneously with operands OP1, OP2 for the same instruction. The output start_d1 of register 114.7 is inverted by inverter 632. The outputs of inverter 632 and AND gate 628 are ORed by OR gate 634 whose output s1 is latched by master-slave flip-flop 638. The flip-flop's output, labelled s2, is ANDed with short by AND gate 628.

AND gate 642 generates s3=s1 & s2. Signal s3 is latched by master-slave flip-flop 646 whose output provides sout. All the registers 114.i and flip-flops 638, 646 are master-slave flip-flops triggered by the positive edge of the same clock CLK.

If start=0, on the next cycle s1=1, and two cycles later sout=1. When start is asserted in a clock cycle n to indicate the beginning of an instruction, short becomes valid for the instruction on the next cycle n+1, that is, on the same cycle on which the adder 122 (FIG. 1) performs the addition for the instruction. If s2 has remained at 1 since before start was asserted, then s1 becomes equal to short. In the same cycle n+1, s3 becomes equal to short. On the next cycle, that is, in the second pipeline stage, sout becomes equal to short.

When start is asserted and short becomes 0, s2 becomes 0 on the next cycle and holds s1, s2, s3 and sout at 0 until start is deasserted.

Figure 7:
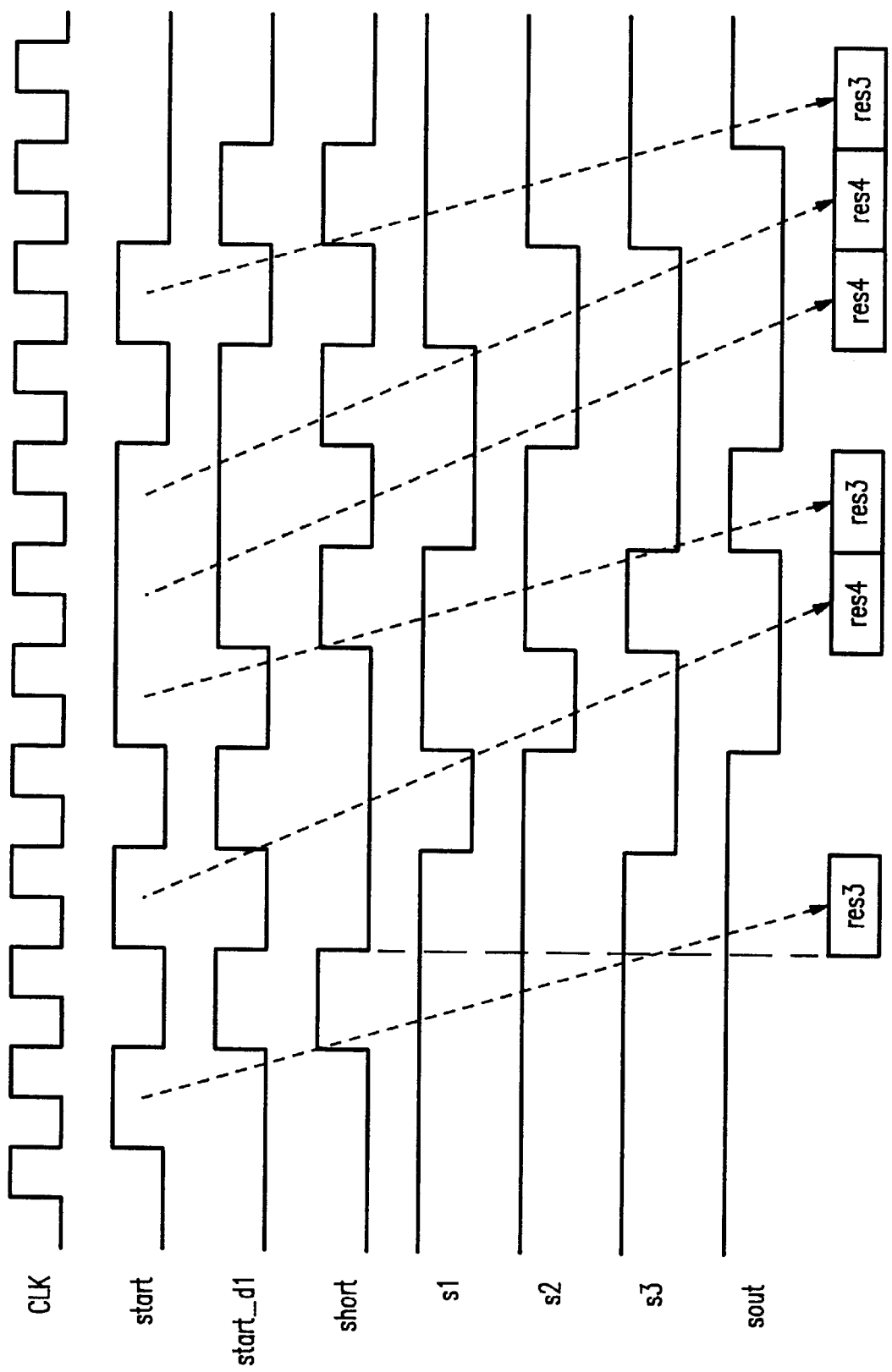
FIG. 7 is a timing diagram for the signals of the circuit of FIG. 6.

FIG. 7 illustrates the timing for the circuit of FIG. 6 for the instruction sequence {s-l-sls-s}, where "s" denotes a usual instruction, "l" denotes an unusual instruction, and "-" denotes no instruction. Boxes "res3" and "res4" at the bottom indicate when respectively a 3-cycle or 4-cycle result is selected by result multiplexer 146. Dashed diagonal lines connect each box to the portion of the start signal for the same instruction. The signals change on the falling edge of clock CLK because the registers and flip-flops in FIG. 6 are master-slave flip-flops.

FIGS. 8–10 illustrate the operation of result multiplexer 146 and result multiplexer control circuit 710. Circuit 710 generates 3-bit control signal RMC to result multiplexer 146. Circuit 710 receives the following input signals:

1) Result type signals:
   a) res_nrm=NOT (DIF<2) AND NOT OF. This signal means that the result is normalized. This signal is generated by EASC 126.
   b) res_inf means that the result is infinity. This signal is asserted by operand analyzer 414 if one of the operands OP1, OP2 is infinity and the other operand is not zero.
   c) res_zero is asserted by operand analyzer 414 if one of the operands OP1, OP2 is zero and the other operand is not infinity.

Signals res_nrm, res_inf, res_zero are generated in the second pipeline stage. Their respective delayed versions res_nrm_d1, res_inf_d1, res_zero_d1 are delayed by one cycle. Signal res_nrm_d1 is generated by EASC 126. Signals res_inf_d1, res_zero_d1 are generated by operand analyzer 414.

Other input signals of result multiplexer control circuit 710 are as follows.

2) sout
3) Overflow and underflow signals generated by EASC 126:

a) OVF=(SUM>ExpMax+1) generated by EASC 126 means an overflow.

b) OVF_c=(SUM=ExpMax+1) means a conditional overflow, that is, an overflow occurs if MSBP=1 but no overflow occurs if MSBP=0. Signals OVF, OVF_c are generated in the second pipeline stage.

c) OVF_d1 and OVF_c_d1 are generated in the third pipeline stage. These signals are delayed versions of respectively OVF, OVF_c.

d) UNF_d1=(DIF<1) means an underflow. This signal is generated in the third pipeline stage.

e) UNF_c_d1=(DIF=1) means a conditional underflow. This signal is generated in the third pipeline stage.

4) MSBF, MSBR.

5) "excep" means an unmasked exception. This signal is generated from OVF_754 (overflow), UNF_754 (underflow), INEX (inexact result) and INV (invalid operands) which are four exception signals in accordance with IEEE Standard 754. OVF_754 and UNF_754 are generated by EASC 126. INEX is generated by adder 134 for fast instructions and adder 154 for slow instructions. INV (which means a signal NaN operand or a multiplication of zero by infinity) is generated by operand analyzer 414. Signal "except" is set if any of the four exceptions occurs and the corresponding exception mask in register 114.6 is "1".

Of note, no more than one signal in each of the following two groups can be set in any given clock cycle:

Group I: res_nrm, res_inf, res_zero, OVF, OVF_c;

Group II: res_nrm_d1, res_inf_d1, res_zero_d1, OVF_d1, OVF_c_d1, UNF_d1, UNF_c_d1.

FIG. 8 illustrates signals in result multiplexer control circuit 710 and result multiplexer 146 when sout=1, that is, for 3-cycle instructions. FIG. 9 illustrates signals in circuits 710, 146 when sout=0. In the tables of FIGS. 8 and 9, RMC is the signal generated by result multiplexer control circuit 710. Column "Result" shows the result generated by multiplexer 146 in response to signal RMC. "FAD<<1" means FAD shifted left by one bit. "RAD<<1" means RAD shifted left by one bit. OVFL means an overflow. "x" means "don't care."

FIG. 10 shows the exponent and fraction portions of signal Rs generated by multiplexer 146 for each value in the "Result" column in FIGS. 8 and 9.

Figure 11:
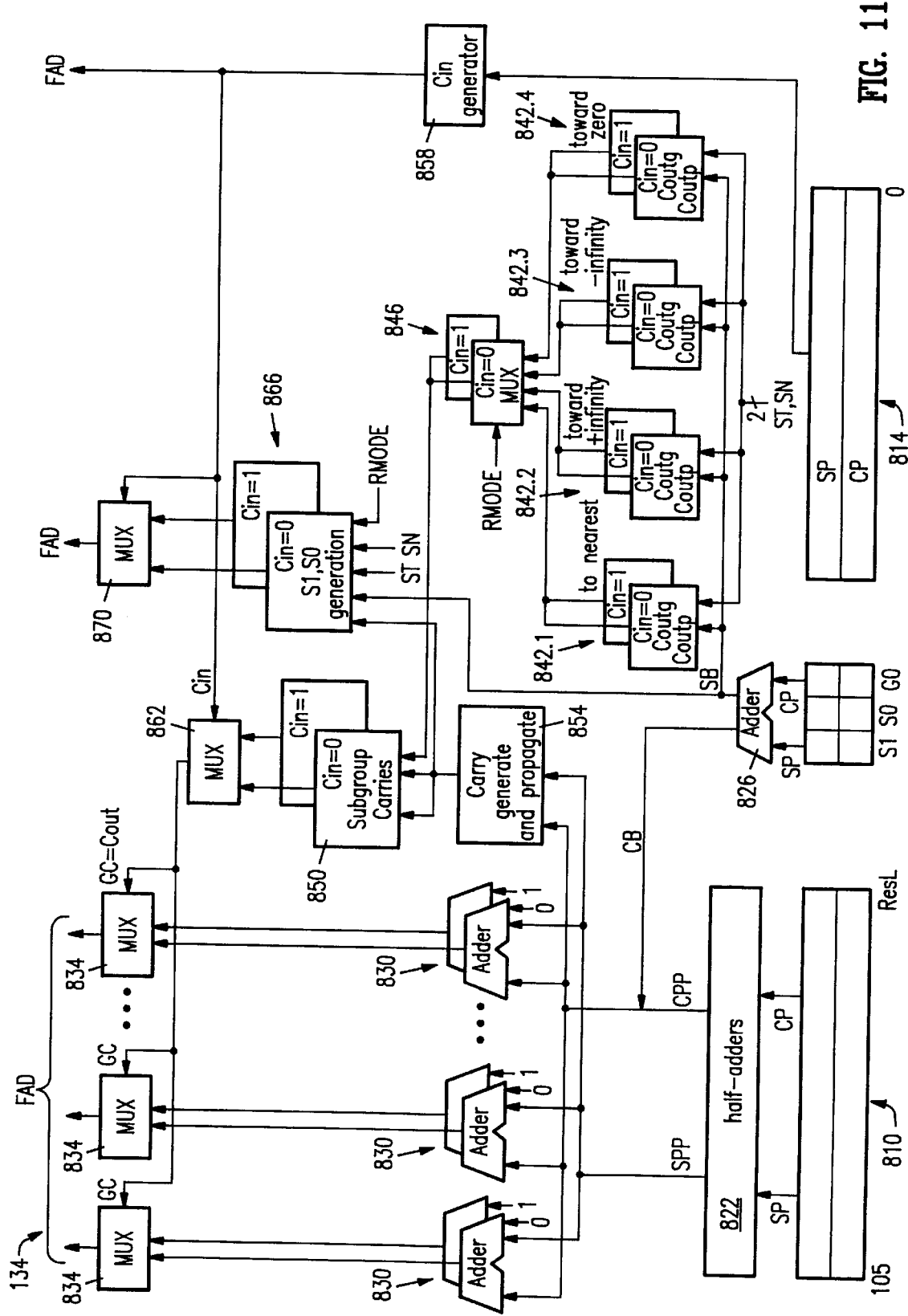
FIG. 11 is a block diagram of an adder of the multiplier FIG. 1.
Figures 12, 13:
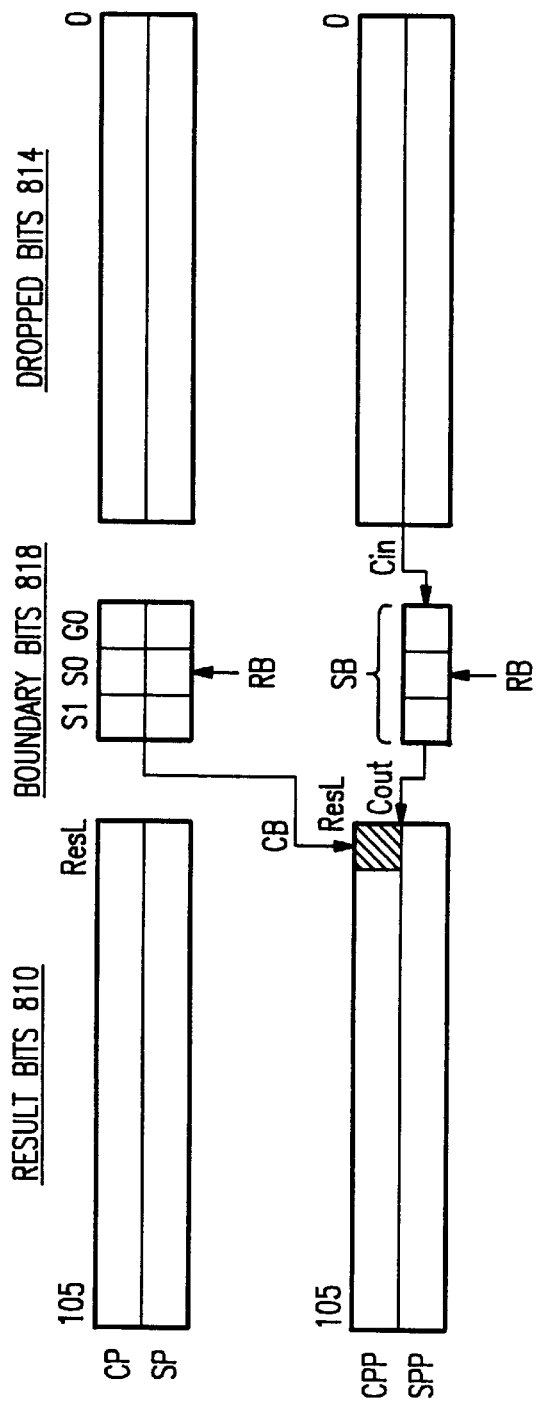
FIG. 12 illustrates input signals and operations in the adder of FIG. 11.
FIG. 13 is a table of signals in the adder of FIG. 11.

FIG. 11 is a block diagram of significand adder 134. FIG. 12 illustrates operations performed by adder 134. If sout=1, that is, the instruction will be completed in three cycles, adder 134 performs both addition and rounding. If sout=0, adder 134 performs the addition but not rounding; rounding is performed by adder 154.

To make rounding faster, the bit positions [105:0] are divided into the following groups: group 810 of result bits which will be included in the significand of the result Rs of the instruction; group 814 of dropped bits not included in the significand of the result; and group 818 of boundary bits S1, S0, G0. Bit S0 is the least significant bit of the significand of the result Rs if MSBF=0. If MSBF=1, the least significant bit of Rs is S1. G0 is a guard bit, which is not included in the result.

The position of the result bits, the dropped bits and the boundary bits is determined based on the assumption that MSBF=FAD[105] and the result Rs will be normalized, because the adder 134 performs rounding only when this assumption is true. Thus, the least significant bit ResL of result bits 810 is bit 54 for double format instructions and bit 83 for single format instructions.

In fraction adder 134, the rounding overlaps with the addition so that the delay compared to the addition without rounding is only a half-adder delay.

When CP, SP are added, two carries can be generated into result bits 810: a carry from the addition of boundary bits 818 and dropped bits 814, and a carry from the addition of rounding bit RB to bit S0 (if MSBF=0) or S1 (if MSBF=1). The addition of SP and CP is performed as follows. The result bits SP[105:ResL], CP[105:ResL] are delivered to a row of half-adders 822 which perform bitwise addition and generate a sum vector SPP[105:ResL] and a carry vector CPP[105:ResL+1]. At the same time, adder 826 adds the boundary bits 818 of vectors SP, CP and generates the sum SB and a carry CB which is placed in CPP[ResL].

To add SPP[105:ResL] and CPP[105:ResL], the result bits are divided into subgroups for conditional sum generation. For each subgroup, a respective adder 830 generates two conditional sums of the respective bits of SPP, CPP. One of the two sums assumes that the carry into the subgroup is 0. The other sum assumes the carry into the subgroup is 1. Operation of subgroup adders 830 is similar to the operation performed in conventional conditional-sum adders such as described, for example, in A. R. Omondi, "Computer Arithmetic Systems: Algorithms, Architecture and Implementation", 1994, pp. 76–89 hereby incorporated herein by reference.

The conditional sums for each subgroup are delivered to the data inputs of a respective multiplexer 834. The select input of the multiplexer receives a respective carry GC into the subgroup. The multiplexer selects the sum corresponding to the carry GC, as in a conventional conditional-sum adder. However, the subgroup carries GC take into account the rounding carry RB and the carry Cin from the dropped bits 814.

The carries GC are generated as follows. The addition of carry Cin and rounding carry RB to the boundary-bit sum SB can generate at most one carry Cout into the result bits. See FIG. 12. Logic expressions for the carry Cout can be constructed from truth tables, such as Tables 4 and 5 below, which express Cout in terms of: 1) bits S1, S0, G0 of boundary sum SB; 2) MSBF; 3) Cin; 4) sticky bit ST; 5) the result sign SN; and 6) the rounding mode. SN is the exclusive OR of the signs of the operands OP1, OP2. Sticky bit ST=1 if, and only if, at least one dropped bit in the product FAD is 1. ST is generated before FAD by circuit 838 (FIG. 1) as follows. Circuit 838 determines the total number SLSBZ of the least significant zeroes of the significands of operands OP1, OP2, where the significands of single-format operands are represented in a 53-bit field as described above. If SLSBZ<ResL-3, then ST is set to 1. Otherwise, ST is set to 0. Of note, ResL-3 is the position of guard bit G0.

ST and SN are delivered to adder 134 in the second pipeline stage.

Tables 4 and 5 are truth tables for the carry Cout for the rounding mode "round to nearest". In Table 4, Cin=0. In Table 5, Cin=1. ST and SN are omitted because they do not influence Cout in the "round to nearest" mode.

TABLE 4

| | Cin = 0 | | | |
|---|---|---|---|---|
| MSBF | S1 | S0 | G0 | Cout |
| 0 | 0 | 0 | 0 | 0 |
| 0 | 0 | 0 | 1 | 0 |
| 0 | 0 | 1 | 0 | 0 |

TABLE 4-continued

| | | Cin = 0 | | |
|---|---|---|---|---|
| MSBF | S1 | S0 | G0 | Cout |
| 0 | 0 | 1 | 1 | 0 |
| 0 | 1 | 0 | 0 | 0 |
| 0 | 1 | 0 | 1 | 0 |
| 0 | 1 | 1 | 0 | 0 |
| 0 | 1 | 1 | 1 | 1 |
| 1 | 0 | 0 | 0 | 0 |
| 1 | 0 | 0 | 1 | 0 |
| 1 | 0 | 1 | 0 | 0 |
| 1 | 0 | 1 | 1 | 0 |
| 1 | 1 | 0 | 0 | 0 |
| 1 | 1 | 0 | 1 | 0 |
| 1 | 1 | 1 | 0 | 1 |
| 1 | 1 | 1 | 1 | 1 |

TABLE 5

| | | Cin = 1 | | |
|---|---|---|---|---|
| MSBF | S1 | S0 | G0 | Cout |
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 0 |
| 0 | 1 | 0 | 1 | 0 |
| 0 | 1 | 1 | 0 | 1 |
| 0 | 1 | 1 | 1 | 1 |
| 1 | 0 | 0 | 0 | 0 |
| 1 | 0 | 0 | 1 | 0 |
| 1 | 0 | 1 | 0 | 0 |
| 1 | 0 | 1 | 1 | 0 |
| 1 | 1 | 0 | 0 | 0 |
| 1 | 1 | 0 | 1 | 1 |
| 1 | 1 | 1 | 0 | 1 |
| 1 | 1 | 1 | 1 | 1 |

From Tables 4 and 5, we obtain:

$$\text{Cout} = S1\&S0\&G0 | MSBF\&S1\&S0 \text{ if Cin}=0,$$

$$\text{Cout} = S1\&S0 | MSBF\&S1\&G0 \text{ if Cin}=1. \quad (1)$$

Expressions for Cout in the remaining rounding modes can be obtained similarly.

To reduce the delay due to rounding, adder 134 is constructed similarly to a non-rounding conditional-sum cyclic adder. (A cyclic adder is an adder that adds the end-around-carry to the least significant bit.) Carry Cout is generated as:

$$\text{Cout} = \text{Coutg} | MSBF \& \text{Coutp}. \quad (2)$$

In a non-rounding cyclic adder, Coutg would be a carry generate signal for the boundary bits 818, Coutp would be a carry propagate signal for the boundary bits, and MSBF would be the end-around carry into the boundary bits. In adder 134, signals Coutg, Coutp have a different meaning defined below. However, because the carry expression (2) is the same as for a non-rounding adder, the delay of adder 134 is equal to the delay of a non-rounding adder plus one half-adder delay of adders 822.

Signal Coutg is the value of Cout when MSBF=0. Coutp is the value of Cout when MSBF=1. Each circuit 842.1 through 842.4 generates Coutg, Coutp for a respective one of the four rounding modes "to nearest", "toward plus infinity", "toward minus infinity", and "toward zero" in accordance with FIG. 13. The expressions of FIG. 13 can be obtained as follows. Obtain expressions for Cout such as expressions (1) above. In the expressions for Cout, set MSBF=0 to obtain expressions for Coutg, and set MSBF=1 to obtain expressions for Coutp. Each circuit 842.i generates Coutg, Coutp for Cin=0 and Cin=1. Multiplexer 846 selects carries Coutg, Coutp based on the rounding mode signal RMODE generated from the rounding mode signal RM (FIG. 1).

Subgroup carry generator circuit 850 receives the carry signals Coutg, Coutp from multiplexer 846 and also receives from circuit 854 carry generate and carry propagate signals for the subgroups of result bits 810. Carry generator circuit 850 generates subgroup carries GC for the cases Cin=0 and Cin=1. The subgroup carries for each of the two Cin values are generated as in a conventional non-rounding conditional-sum adder.

Operating in parallel with circuits 842.i, 846, 850, 826, 822, and 830, circuit 858 adds the dropped bits 814 of operands CP, SP and generates 1) the dropped bits of FAD, and 2) the carry Cin from the dropped bits. Based on the carry Cin, multiplexer 862 selects the respective subgroup carries GC generated by circuit 850. The dropped bits of FAD may become part of the result in 4-cycle instructions.

Circuit 866 receives boundary sum SB, sticky bit ST, result sign SN, and rounding mode RMODE. For each value of Cin, circuit 866 generates the result bits S1, S0 by adding the rounding bit RB to bit S0 (if MSBF=0) or S1. Circuit 866 generates MSBF signals for the cases Cin=0 and Cin=1 from: 1) the possible carries for Cin=0 and 1, into the most significant subgroup of result bits 810; these carries are generated by circuit 850; and 2) carry propagate and carry generate signals for the most significant subgroup; these signals are generated by circuit 854.

Multiplexer 870 selects the appropriate boundary bits of FAD based on the value Cin.

If sout=0, then the rounding mode signal RMODE in adder 134 is set to "round toward zero" regardless of the value RM. Rounding bit RB in adder 134 is set to zero. The rounding is performed by rounding adder 154 using methods known in the art. See, for example, R. K. Yu et al., "167 MHz Radix-4 Floating Point Multiplier", Proceedings of the Twelfth Symposium on Computer Arithmetic (IEEE 1995), pages 149–154, hereby incorporated herein by reference. The sticky bit for adder 154 is generated by circuit 874 (FIG. 1) as follows. The sticky bit is 1 if and only if $$SLSBZ-RSHIFT+LSHIFT<ResL-3$$

The sticky bit is pipelined to reach the rounding adder in the third pipeline stage.

Exception mask register 114.6 (FIG. 1) receives a 4-bit exception mask with one bit for each of the exceptions "Invalid Operation", "Overflow", "Underflow", "Inexact" specified by the IEEE Standard 754. Exception generator 878 receives the mask from register 114.6 and also receives: 1) MSBF and MSBR from respective adders 134, 154; 2) OVF, OVF_c, UNF, and UNF_c from EASC 126; inexact exception signals INEX from adders 134, 154; 4) INV from operand analyzer 414; and 5) the signal sout from EASC 126. Exception generator 878 generates two 4-bit exception signals. Each signal has one bit for each of the four exceptions. One of the 4-bit signals takes into account the exception mask, and the other one of the 4-bit signals does not. To provide the exception signals on the same clock cycle on which the corresponding result Rs is generated, 878 uses register/multiplexer circuitry similar to that of FIG. 3.

Diagnostic information register 114.1 receives the instruction number and provides it to diagnostic information multiplexer 882. Multiplexer 882 receives the signal sout from EASC 126. Diagnostic information multiplexer 882 provides the diagnostic information to result multiplexer 146.

The invention is not limited by the embodiments described above. In particular, the invention is not limited by any floating point format or by any circuitry or fabrication technology. In some embodiments, a new instruction cannot be started every clock cycle but can only be started every 2 cycles or some other number of cycles. In some embodiments, multiplication instructions are part of combined multiply-add instructions or other instructions, and a floating point multiplier of the invention is a part of a multiply-add unit or a unit for executing other instructions that incorporate multiplication. Other embodiments and variations are within the scope of the invention, as defined by the appended claims.

We claim:

1. A computer instruction execution unit comprising:
    a first execution path for executing computer instructions; and
    a second execution path for executing computer instructions, the second path sharing circuitry with the first path, the second path being pipelined, the second path having a higher instruction execution latency than the first path;
    wherein the circuitry shared by the first and second paths comprises a control circuit for causing the instruction execution unit to select either the first or the second path to provide an instruction result, so that:
        (a) the result of a first category instruction received by the execution unit after at least a predetermined number of clock cycles within which no instruction has been received is provided by the first execution path;
        (b) the result of a second category instruction is provided by the second execution path; and
        (c) the result of a first category instruction received by the execution unit within a predetermined number of clock cycles of receipt of a second category instruction is provided by the second execution path.

2. The computer instruction execution unit of claim 1 wherein the result of a first category instruction received by the execution unit after an instruction whose result is provided by the first execution path, with no intervening instructions, is also provided by the first execution path.

3. The computer instruction execution unit of claim 1 wherein:
    the first category instructions and the second category instructions are floating point instructions;
    the second execution path comprises a shifter for performing normalization and denormalization, the shifter not being a part of the first execution path; and
    for the first category instructions, normalization and denormalization involve a shift by at most N digits, N being a positive integer, and the shifter is operable to perform shifts by more than N digits.

4. The execution unit of claim 3 which unit is a floating point multiplier,
    wherein the circuitry shared by the first and second execution paths comprises a first circuit for multiplying significands of an instruction's operands and generating a signal indicative of a product of the significands,
    wherein the shifter is for shifting the product represented by the signal generated by the first circuit, and
    wherein the circuitry shared by the first and second execution paths further comprises a multiplexer, controlled by the control circuit, for selecting among a plurality of signals including: 1) the signal generated by the first circuit, and 2) a signal indicative of a shifted product produced by the shifter.

5. The computer instruction execution unit of claim 1 further comprising a third execution path sharing circuitry with the first and second paths, the third execution path being pipelined, the third path having a higher instruction execution latency than the first path but a lower instruction execution latency than the second path;
    wherein the result of a third category instruction received by the execution unit after at least a predetermined number of clock cycles within which no instruction has been received is provided by the third execution path;
    wherein the result of a third category instruction received by the execution unit within a predetermined number of clock cycles or receipt of a second category instruction is provided by the second execution path; and
    wherein the result of a first category instruction received by the execution unit within a predetermined number of clock cycles or receipt of a third category instruction I3 is provided by the third execution path if the result of the third category instruction I3 was provided by the third execution path.

6. A method to execute computer instructions, the method comprising:
    receiving computer instructions on an input of a computer instruction execution unit;
    if an instruction I1 received on the input belongs to a first category of instructions, and if no instruction was received on the input for at least a predetermined number of clock cycles before the instruction I1, then executing the instruction I1 by a first circuit of the computer unit;
    if the instruction I1 belongs to a second category of instructions, then executing the instructing I1 by a second circuit of the computer unit, wherein the first and second circuits share circuitry, wherein the second circuit comprises a plurality of pipeline stages such that while one of the stages executes one instruction another one of the stages is available to execute another instruction, and wherein execution by the second circuit takes more clock cycles than execution by the first circuit;
    if the instruction I1 belongs to the first category and is received on the input within a predetermined number of clock cycles after an instruction of the second category, then executing the instruction I1 by the second circuit.

7. The method of claim 6 wherein a first category instruction received on the input within a predetermined number of clock cycles after receipt of an instruction executed by the first circuit is also executed by the first circuit.

8. The method of claim 6 wherein a first category instruction received on the input within a predetermined number of clock cycles after receipt of an instruction executed by the second circuit is also executed by the second circuit.

9. The method of claim 6 wherein:
    each instruction of the first and second categories is a floating point instruction,
    for each first category instruction, a result normalization requires a shift of a significand of the result by at most one digit, and
    the second category comprises instructions for which a result normalization or denormalization requires a shift by more than one digit.

10. The method of claim 9 wherein each instruction of the first and second categories is a multiplication instruction.

11. A method for providing a computer instruction execution unit, the method comprising:

providing a first execution path for executing computer instructions; and providing a second execution path for executing computer instructions, the second path sharing circuitry with the first path, the second path being pipelined, the second path having a higher instruction execution latency than the first path;

wherein the circuitry shared by the first and second paths comprises a control circuit for causing the instruction execution unit to select either the first or the second path to provide an instruction result, so that:

the result of a first category instruction received by the execution unit after at least a predetermined number of clock cycles within which no instruction has been received is provided by the first execution path;

the result of a second category instruction is provided by the second execution path; and the result of a first category instruction received by the execution unit within a predetermined number of clock cycles of receipt of a second category instruction is provided by the second execution path.

12. A computer instruction execution unit comprising a plurality of instruction execution paths, wherein any two of the paths have different latencies and wherein different paths share circuitry, wherein each path is operable to execute one or more instructions of a category corresponding to the path, wherein an instruction I1 of any category is executed by the corresponding path P1 unless an instruction I2 executed before I1 by a path P2 having a higher latency than P1 prevents the instruction I1 from being executed with the latency of the path P1, in which case the instruction I1 is executed by an execution path slower than P1 not to block circuitry shared by the path P1 with at least one other path.

13. The computer instruction execution unit of claim 12 wherein if the instruction I2 prevents the instruction I1 from being executed with the latency of the path P1, and if between the instructions I1 and I2 the execution unit does not receive any instruction slower than I2, then the instruction I1 is executed by the path P2 not to block circuitry shared by the paths P1 and P2.

14. A computer instruction execution unit comprising:

a first circuit for performing at least a portion of work needed to execute an instruction; and a second circuit for receiving an output of the first circuit and providing a result of an instruction;

wherein the instruction execution unit is pipelined so that while the second circuit executes one instruction the first circuit is available to execute another instruction; and wherein the second circuit comprises a first path operable to execute instructions of a first category but not a second category and a second path operable to execute instructions of the first and second categories, the second path having a greater latency than the first path.

15. The instruction execution unit of claim 14 wherein when a first category instruction I1 is received by the unit immediately after a second category instruction, the instruction I1 is executed by the second path not to block the first circuit.

16. The instruction execution unit of claim 14 wherein the second path latency is CLK1 clock cycles greater than the first path latency, wherein CLK1>0, and when a first category instruction I1 is received by the unit within CLK1 clock cycles after a second category instruction, the instruction I1 is executed by the second path not to block the first circuit.

17. The instruction execution unit of claim 16 wherein CLK1=1.

18. The instruction execution unit of claim 14 which unit comprises a floating point multiplier, wherein the first circuit comprises a circuit for multiplying significands of the instruction's operands, and wherein the second circuit comprises a circuit for normalizing and rounding a result of the multiplication of the significands.

19. A method to execute computer instructions, the method comprising:

a first circuit performing at least a portion of work needed to execute an instruction; and a second circuit receiving an output of the first circuit and providing a result of an instruction;

wherein while the second circuit executes one instruction the first circuit is available to execute another instruction; and wherein the second circuit comprises a first path operable to execute instructions of a first category but not a second category and a second path operable to execute instructions of the first and second categories, the second path having a greater latency than the first path.

20. The method of claim 19 wherein when a first category instruction I1 is received by the unit immediately after a second category instruction, the instruction I1 is executed by the second path not to block the first circuit.

21. The method of claim 19 wherein the second path latency is CLK1 clock cycles greater than the first path latency, wherein CLK1>0, and when a first category instruction I1 is received by the unit within CLK1 clock cycles after a second category instruction, the instruction I1 is executed by the second path not to block the first circuit.

22. The method of claim 21 wherein CLK1=1.

23. The method of claim 19 wherein said instructions comprise floating point multiplication, wherein the first circuit comprises a circuit for multiplying significands of the instruction's operands, and wherein the second circuit comprises a circuit for normalizing and rounding a result of the multiplication of the operands.

* * * * *